United States Patent

Jacomini

[11] Patent Number: 6,147,639
[45] Date of Patent: Nov. 14, 2000

[54] SLOW SPEED PULSE CHASE APPARATUS

[75] Inventor: Omar J. Jacomini, Severna Park, Md.

[73] Assignee: The United States of America as represented by the Secretary of the Air Force, Washington, D.C.

[21] Appl. No.: 06/883,237

[22] Filed: Apr. 16, 1986

[51] Int. Cl.[7] .................................................. G01S 13/48
[52] U.S. Cl. ........................ 342/157; 342/160; 342/155
[58] Field of Search .................................... 342/157, 160, 342/155

[56] References Cited

U.S. PATENT DOCUMENTS

| | | | |
|---|---|---|---|
| 3,171,126 | 2/1965 | Wiley | 342/148 |
| 3,938,149 | 2/1976 | Grantham | 342/157 X |
| 4,034,374 | 7/1977 | Kruger | 342/155 |
| 4,176,357 | 11/1979 | Fales, III | 342/453 |
| 4,214,244 | 7/1980 | McKay et al. | 342/17 |
| 4,253,098 | 2/1981 | Blythe | 342/157 X |
| 4,336,540 | 6/1982 | Goodwin et al. | 342/157 |
| 4,404,561 | 9/1983 | Mulder et al. | 342/147 |
| 4,408,205 | 10/1983 | Hockham | 342/157 |
| 4,593,286 | 6/1986 | Mathews et al. | 342/157 X |
| 4,782,343 | 11/1988 | Marchais | 342/160 |
| 4,809,002 | 2/1989 | Togashi et al. | 342/160 |
| 4,862,177 | 8/1989 | Wong | 342/160 |
| 5,347,281 | 9/1994 | Lewis et al. | 342/160 |
| 5,371,504 | 12/1994 | Lewis | 342/114 |
| 5,422,646 | 6/1995 | Lewis | 342/160 |
| 5,463,399 | 10/1995 | Kretschmer | 342/132 |
| 5,530,448 | 6/1996 | Lewis | 342/132 |

Primary Examiner—John B. Sotomayor
Attorney, Agent, or Firm—William G. Auton

[57] ABSTRACT

A slow speed pulse chase apparatus in a bistatic radar system, wherein the receive antenna follows the transmit pulse out in space. The receive beam comprises many parallel beams that overlap all the possible positions of the transmit pulse as it travels into space. Slow speed chase apparatus provides a small group of beams which are held in a fixed location as the transmit pulse travels by and then is jumped in one large step to continue to the next position to remain there until the transmit pulse travels by.

8 Claims, 3 Drawing Sheets

SLOW SPEED PULSE CHASE APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a radar system, and in particular to a slow speed pulse chase apparatus for a bistatic radar system.

In a bistatic radar system, one of the methods of operation has the receive antenna follow the transmit pulse as it travels out into space. This can be accomplished by moving the receive antenna with its attendant beam pattern many times in very small descrete steps.

Another bistatic process utilizes many parallel receive beams that overlap all of the possible positions of the transmit pulse as it travels away from the radar system. This causes the system to be very expensive because of the large number of beams involved.

The geometry of an active illuminator and a passive receiver has been utilized in many prior art bistatic radar systems. If the receiver of a bistatic pair has a fixed beam during one transmitter interpulse period, useful echoes are only received from a small region where the transmit and receive beams overlap. The resulting coverage would be limited to a narrow fence.

In order to get a greater coverage volume for air surveillance, the receiving antenna must somehow follow the echo volume swept out by a transmitted pulse. One possibility is that the receiving antenna steer its beam along the transmit line-of-sight with a schedule that is matched to the arrival time of echoes from points along that line-of-sight. This method is called pulse chasing. The earlier paragraphs on bistatic geometry discussed the need to match the receiving beamwidth to the combination of the transmitted bandwidth and the pulse length in space.

Another method of collecting echoes from points along a transmitted out-of-sight is to produce a set of contiguous fixed beams which cover the desired segment of space along the transmitter line-of-sight. Echoes are not present continuously in these beams. Instead echoes are confined to a time interval around the delay that is caused by propagation from the transmitter to the region of beam overlap and then back to the receiver. Because of this, the beams need not all be active simultaneously, and receivers can be time-shared between them.

The antenna configuration affects the basic feasibility of the alternative methods of receiving echoes from a time-varying direction, during one interpulse period. A lens-type antenna is generally compatible with a large set of fixed beams, whose selection can be programmed in time. This type of antenna has multiple output ports which correspond to different receive beam directions. An antenna which uses switched phase shifters and time delays is generally compatible with steering one beam, a monopulse group, or a small cluster of beams, to achieve pulse chasing.

FIGS. 1a, b and c show three methods of obtaining coverage along a transmitted line-of-sight by steering or switching receiving beams. The first case (prior art), shown in FIG. 1a is a pure pulse chasing system. The direction and beamwidth of a receiving beam are changed with time to follow the echo region of the transmitted pulse. This requires a rapid programmed sequence of phase shifter states in the receiving elements on the array face. FIGS. 1b and 1c are alternative embodiments of the present invention. The second case which is shown in FIG. 1b, employs a cluster of beams which span a relatively narrow sector. This cluster is fixed while the echo region sweeps through the sector, and then switched as a group to an adjacent sector. The antenna needs to have simultaneous output ports for the beams in the cluster. Switching from one sector to the next occurs at a much slower rate than does the switching for beam control in pure pulse chasing. The third case which is shown in FIG. 1c, uses a large set of adjacent beams to which receiver channels are sequentially connected. The pattern of sequencing the receivers to the beam ports causes the active receive beam closest to the transmitter to be disconnected in favor of a new active receive beam on the side of the group farthest from the transmitter. Thus, the pattern of active receiving beams is not a jumping sector (as shown in FIG. 1b), but moves like a tank track.

Pure pulse chasing (FIG. 1a) minimizes the number of receivers (one for each beam in a monopulse group, for example) and gives the simplest scheme for clocking range cells. The antenna must, however, have high-speed switching to control the moving and spreading beam. There is also some gain reduction when the beam is spread, compared to a stationary beam in a cluster. The other extreme which is represented by FIG. 1c, is compatible with a lens-type of antenna. Commutation of receivers with respect to the beam ports is needed. This introduces some complexity into the ordering of the range cells. The system of FIG. 1b has a simpler and slower beam steering, but pulse eclipsing will occur at the edges of the active sector when a jump in angle is made. That is, the cluster of beams moves before the entire pulse duration can be received, for echo points near the leading edge of the sector.

In the systems of FIGS. 1b and 1c, the shape and direction of a receive beam is fixed during the interval when it is collecting echos. The FIG. 1a system, pure pulse chasing, the beam changes during pulse reception. There are two technical issues which arise as a result. These are as follows:

1. the effect of phase shifting transients and beam rape modulation on the range sidelobes of a stretched pulse.
2. the degree to which low sidelobes can be maintained when the beam is spread by introducing a non-linear phase progression across the aperture.

In a bistatic receiving system which uses fast pulse chasing, the receiving beam moves during the reception time of an individual echo pulse. This notion can be achieved by changing the phasing of the receiving elements in the aperture. A nominal time interval between new phase conditions is one to two microseconds. In high speed pulse chasing, the beam is really stepped in short steps very frequently. The duration in any one state can be of the order of one to two microseconds. The time of the switching transient must be much shorter, of the order of 0.02 microseconds.

After a switching command to a new phase state, the phase shifter enters a transient condition whose duration depends on the intrinsic switching speed of the device. If the receiver continues to accept inputs during these transients, spurious signals and distortions can corrupt the echo pulses. An alternative is to blank the receiving channels during the interval occupied by the switching transient. This produces a known distortion of the received pulse, in the form of narrow notches occurring periodically across the pulse. In addition to the notches, the motion of the received beam axis with respect to the direction of the target causes some modulation of the pulse envelope by the gain pattern of the beam.

Patent references that are representative of the prior art and that are of interest are listed below as follows:

U.S. Pat. No. 3,171,126 issued to Wiley on Feb. 23, 1965;
U.S. Pat. No. 4,034,374 issued to Kruger on Jul. 5, 1977;
U.S. Pat. No. 4,176,357 issued to Fales, III on Nov. 27, 1979;
U.S. Pat. No. 4,214,244 issued to McKay et al on Jul. 22, 1980;
U.S. Pat. No. 4,404,561 issued to Mulder et al on Sep. 13, 1983; and
U.S. Pat. No. 4,408,205 issued to Hockham on Oct. 4, 1983.

SUMMARY OF THE INVENTION

The present invention utilizes a slow speed pulse chase in a bistatic radar wherein a small group of beams is held in a fixed location as the pulse travels by and then is jumped in one large step to the next contiguous position where it again remains until the pulse travels by. Since the group beam jump size is large, the number of jumps are small and the time that is allowed for the jumps can be measured in microseconds rather than nanoseconds. The receiver unit is able to process longer pulse returns with the small group of beams than can be accomplished with single high-speed beam.

It is one object of the present invention, therefore, to provide an improved slow speed pulse chase apparatus for a bistatic radar system.

It is another object of the invention to provide an improved slow speed pulse chase apparatus wherein the azimuth coverage of one array is approximately 95 degrees.

It is another object of the invention to provide an improved slow speed pulse chase apparatus wherein the individual beams are 1.5 degrees wide at the 3 db point.

It is another object of the invention to provide an improved slow speed pulse chase apparatus which utilizes six beams in conjunction with six receiver channels.

It is another object of the invention to provide an improved slow speed pulse chase apparatus wherein the receiver beam pulse chasing exactly repeats the sequence of beam pointing angles throughout the time the illuminating radar beam dwells on a clutter cell.

These and other advantages, objects and features of the invention will become more apparent after considering the following description taken in conjunction with the illustrative embodiment in the accompanying drawings.

DESCRIPTION OF THE PREFERRED EMBODIMENT

Figure 3:
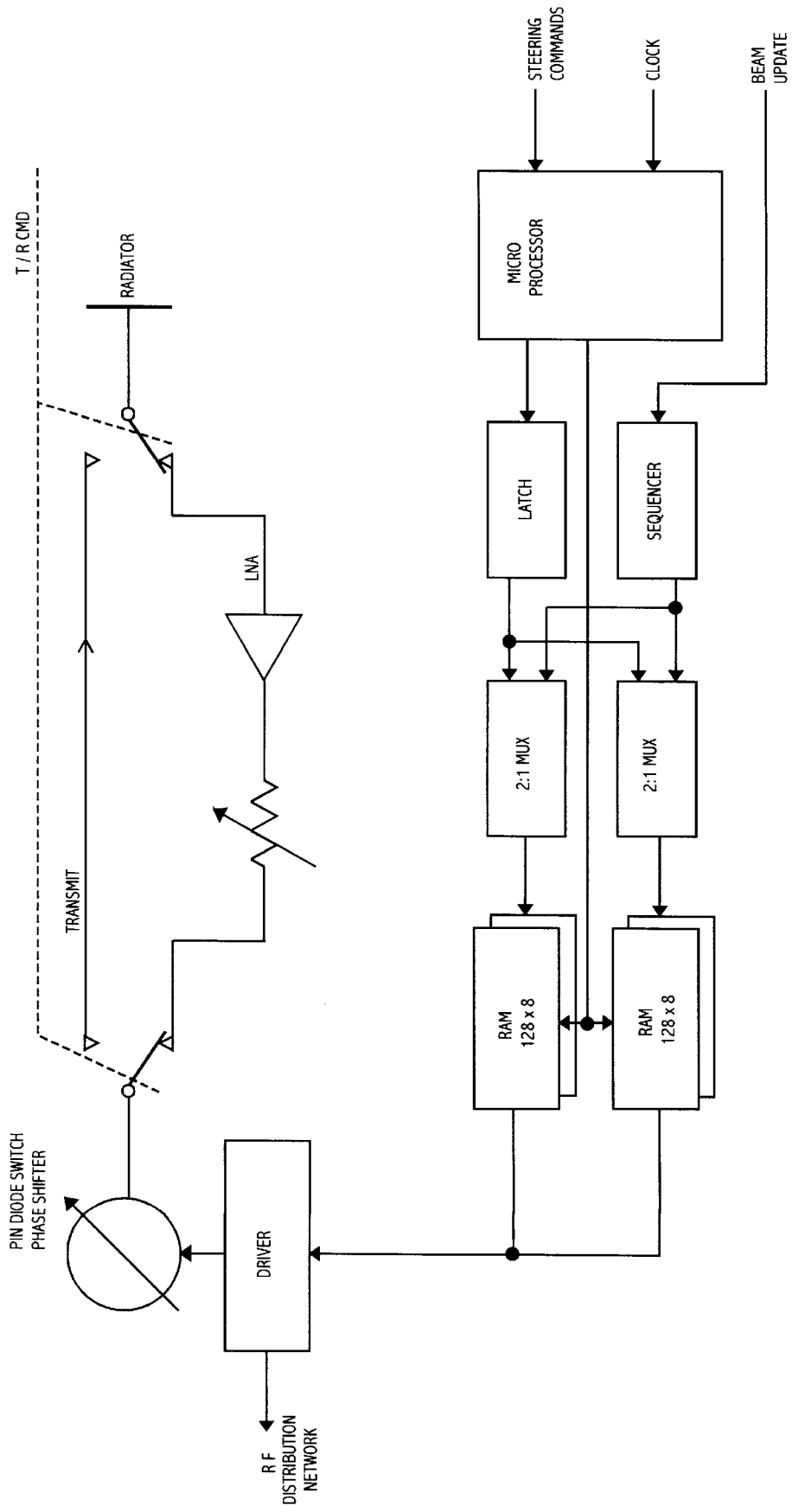

The slow speed pulse chase apparatus is utilized in a bistatic radar system which has multiple receiving beams. The basic component of the slow speed pulse chase apparatus is the T/R module which is shown in FIG. 3. In order to provide the slow speed pulse chase function in the bistatic radar system, a plurality of T/R modules are utilized. They may be as few as 64 modules or as many as approximately 10,000 T/R modules depending upon the application. This plurality of T/R modules are cooperatively operated to provide six receiving beams that are collectively switched to a new pointing angle within a given predetermined time to achieve the slow speed pulse chase operation.

In order to achieve slow speed pulse chase operation in a bistatic radar system, the monostatic anti-transmit-receive (ATR) switches are modified to receive signals from targets that are illuminated by a distant transmitter. In slow speed pulse chase operation, the cluster of six azimuth receiver beams is switched to a new pointing angle in 2 usec. This operation and pointing angle time requirement required that the capacity of the memories which are associated with each of the processors in the 10,000 T/R modules be increased. This was necessitated, in part, by the fact the switching times of all the T/R modules must be synchronized to: 1) maintain the proper phase relationships between the T/R modules to provide the proper angular positions of the six receiving beams, and 2) achieve the collectively receiving beam switching time.

The baseline Advanced Tactical Radar already has a high degree of beam pointing agility to provide search and track of multiple maneuverable targets. The inter-relations between target population, dynamics, update rates, aperture and power of the monostatic radar resulted in the monostatic requirement to limit the change of pointing angle time to 2 usec. The design iterations of the baseline ATR evolved a practical means of accomplishing this speed with available PIN diode technology and acceptable parameters such as weight, power consumption, cost, etc.

In order to achieve a reasonable ratio of beam pointing dwell time-to-beam pointing transition, the monostatic design set a minimum dwell time of 8 usec. Taken together, the dwell and transition times total 10 usec, which corresponds to a 100 kHz maximum beam pointing change rate. These monostatic requirements are adopted without modification as the basis pulse chase requirements based on the slow phase shifter.

The azimuth coverage of one array of six receiving beams is approximately 95 degrees and individual beams are 1.5 degrees wide at the 3 dB point. The system has six beams with six receiver channels with full processing capability.

Figure 1A:
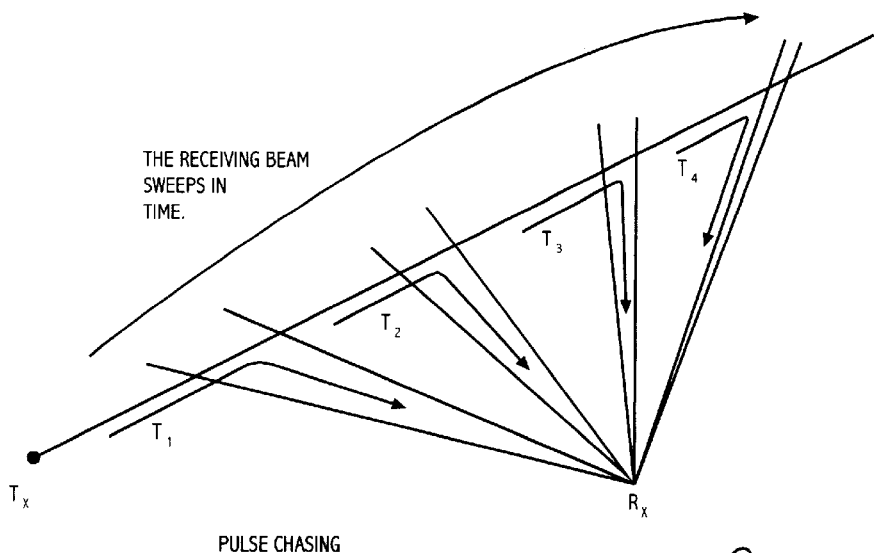
FIGS. 1a, b, and c are graphic representations of the prior art receive beam management systems.
Figure 1B:
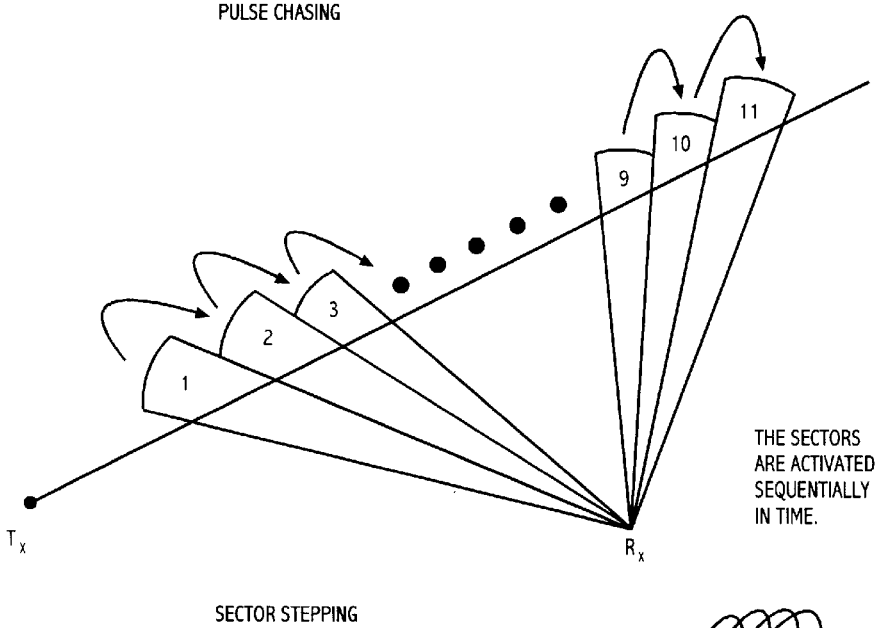
Figure 1C:
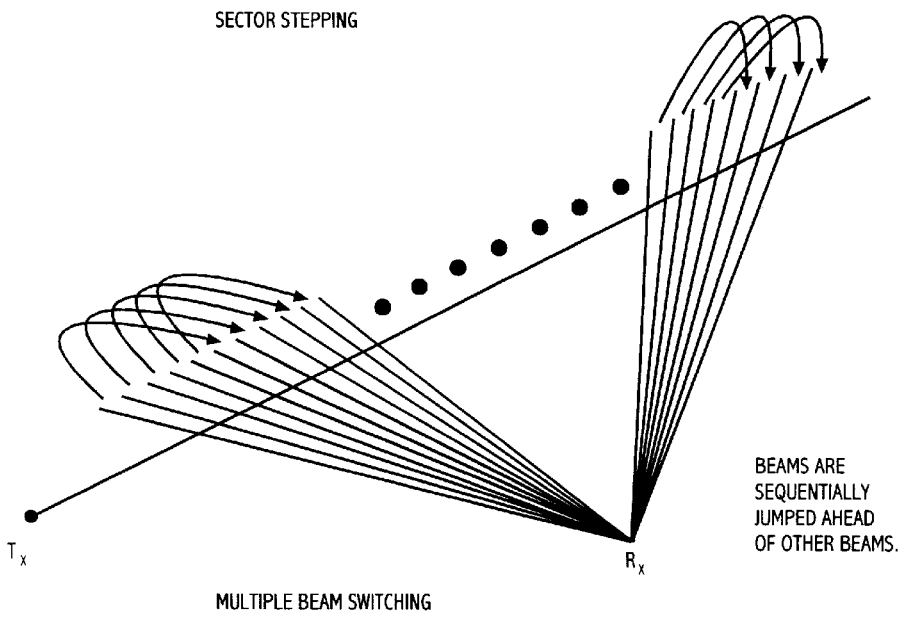
Figure 2:
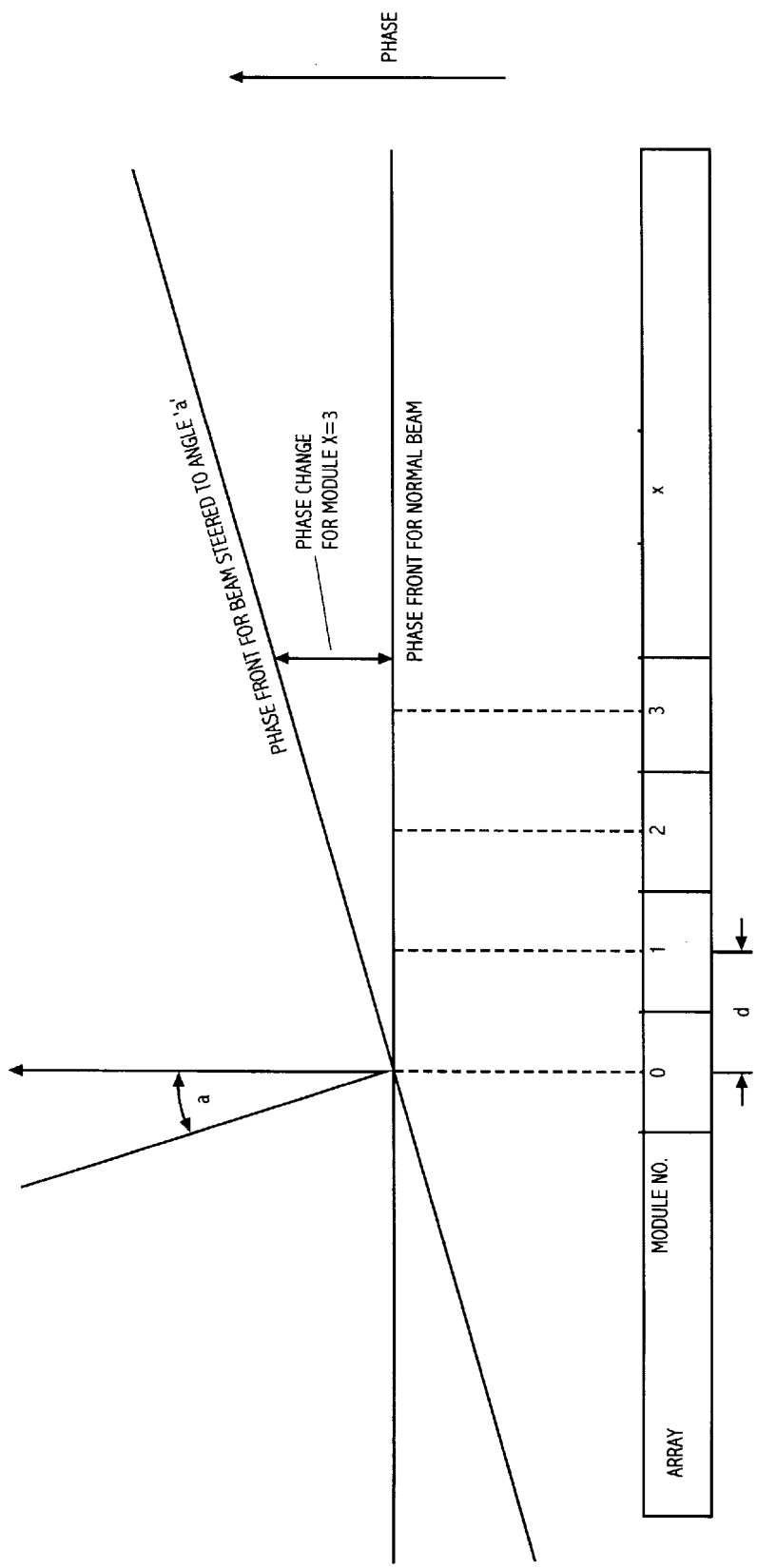
FIG. 2 is a graphic representation of beam steering in a bistatic radar system, and, FIG. 3 is a block diagram of a multistatic transmit/receive (T/R) radar unit according to the present invention.

The monostatic ATR receiver, computes the beam point information in a central controller. This is output as three 8-bit words, which are broadcast via a data distribution network to all T/R modules. In each T/R module, the beam pointing information is converted to a phase shift value that is related to the X and Y co-ordinates of the module in the array. The relation of the beam pointing command to the location of the module in the array and the required phase increment is illustrated in the azimuth dimension in FIG. 2.

The initial phase to which each modules phase shifter is set is governed by the calibration function of the monostatic system and brings all radiating elements to the same phase to create a plane wave front, parallel to the array. This initial phase setting in each individual module can be represented as $P(x)=k(0)$ A plane wave front is rotated through angle "a" ("a" is the angle of the phase front in $\sin(\theta)$ space) the phase (P) of the $X^{th}$ module from the array center is made to be according to the equation:

$P(x)=k(0)+2\pi.X.a/1.d$ where X=integer, 1,2,3 . . .

where 1=wavelength and d=spacing between modules which can be expressed as

P(x)=k(0)+k(1).X where k(1)=2π·d·a/1

The command to rotate phase front of angle "a" in azimuth has the value k(1) and it is this value that is the steering command broadcast to all elements of the array. In the microprocessor in each T/R module, this azimuth command is multiplied by the "X" value (which was set up in the module when it was installed into the array) and added to the initial value. A similar steering command in the elevation axis is processed in the same way in each module and the result combined with the azimuth steering phase shift to give a single phase value. The computation is exactly the same as is performed for the monostatic beam pointing and is accomplished in less than 200 usec. The phase value is truncated to 6 bits (The processing required additional bits) and is stored in one RAM.

A sequence of values of phase corresponding to the sequence of beam pointing angles are computed and stored sequentially in one RAM. The cluster of beams is steered as a group by a single setting of the phases in the T/R modules since the formation of the multiple beams is accomplished in the six fixed RF manifolds which sum sub-array outputs in the appropriate phase relationship. A cluster of six beams, spaced 1.5 degrees will scan 95 degrees in azimuth in a sequence of 11 steps. The limiting case to which a design may iterate is 2 beams, which spaced by 1.5 degrees would require 32 steps to cover 95 degrees of azimuth. The number of steps sets the requirement on the number of 6-bit words to be stored in the RAM. The monostatic Advanced Tactical Radar module design uses a 128-word by 8-bit chip, and if spare memory could be provided for bistatic operation then no additional equipment would be required in the module. However, the monostatic ATR memory requirements may be varied according to a particular system application. For the purposes of the present example, the T/R modules are configured as shown in FIG. 3.

The time to compute one beam pointing angle is less than 200 nsec, hence even in the worse case of a cluster of two beams which would require 32 pointing angles, all the possible pointing angles could be computed in 7 msec. The monostatic T/R module processor is set up to compute and store one sequence of beam pointing values simultaneous with the non destructive reading of a second sequence of values which had previously been stored. This is illustrated in FIG. 3 where two RAMs are toggled between microprocessor for their input and phase shift driver for output.

The fast pulse chase requirements are derived from iterative consideration of the following factors. The variation in time of switching from T/R module to T/R module in array. A budget of 10 nsec was allocated. The budget which was based on a 20 nsec total transient time, degradation of pulse compression range lobes. The remaining 10 nsec budget is applied to the timing distribution.

The variation in time of arrival of off-axis, target return wavefronts across the antenna aperture. The time delay across aperture "A" for off-axis angle "b" is A sin b. For a 17 foot aperture and +/−15 deg offset this gives +/−4.4 nsec peak time delay variation.

The switching times of phase shifters. Initial observations showed that the 10 nsec switching time was set by the driver rise time. Times of the order of 1 sec can be expected.

Although the invention has been described with reference to a particular embodiment, it will be understood to those skilled in the art that the invention is capable of a variety of alternative embodiments within the spirit and scope of the appended claims.

What is claimed is:

1. A slow speed pulse chase apparatus for a bistatic radar system comprising in combination:

a transmitter means to emit a radar signal, a plurality of radar receivers to provide a plurality of receiving beams, said plurality of receiving beams comprising a sector array, said sector array covering a predetermined degrees of azimuthal coverage, said sector array scanning said azimuthal coverage in a predetermined number of steps, and, a plurality of T/R modules operatively connected to said plurality of radar receivers to cooperatively form said plurality of receiving beams, said plurality of T/R modules generating steering and timing signals to sweep the zone of said azimuthal coverage in a predetermined time, each T/R of said plurality of T/R modules respectively comprise in combination:

a microprocessor to receive clock signals and steering commands, said microprocessor generating beam phase signals, a latch means operatively connected to said microprocessor to receive and store said beam phase signals, a sequencer means to receive a beam update signal from a receiver in said plurality of radar receivers, said sequencer means generating a sequence signal, a first and second multiplexer means operatively connected respectively to said latch means and said sequencer means, said first and second multiplexer means receiving said beam phase signals and said sequence signal, said first and second multiplexer means combining said beam phase signals and said sequence signal in a beam phase/position signal, a first and second RAM operatively connected respectively to said first and second multiplexer means to receive therefrom said beam phase/position signal, said first and second RAM respectively storing said beam phase/position signal, a driver means operatively connected to said first and second RAM to receive said beam phase/position signal, a phase shifter means operatively connected to said driver means to receive said beam phase/position signal therefrom, said phase shifter means operatively connected to said bistatic radar system, radiator means for transmitting and receiving radar signals, and, a switching means operatively connected between said phase shifter means and said radiator means, said switching means alternatively providing a first and second signal path between said phase shifter means and said radiator means upon receipt of a T/R command signal.

2. A slow speed pulse chase apparatus as described in claim 1 wherein said plurality of receiving beams comprise six beams.

3. A slow speed pulse chase apparatus as described in claim 1 wherein said predetermined degrees of azimuthal coverage equals 95 degrees.

4. A slow speed pulse chase apparatus as described in claim 1 wherein said plurality of T/R modules equal 10,000 modules.

5. A slow speed pulse chase apparatus as described in claim 1 wherein said predetermined number of radar receivers equals 6.

6. A slow speed pulse chase apparatus as described in claim 1 wherein said phase shifter means comprises a pin diode switch means.

7. A slow speed pulse chase apparatus as described in claim 1 wherein said first path comprises a transmit path and said second path comprises a receive path.

8. A slow speed pulse chase apparatus as described in claim 1 wherein said each of first and second RAM units comprise a 128 word×8 bit chip.

* * * * *